United States Patent Office 2,972,609
Patented Feb. 21, 1961

2,972,609

PURIFICATION OF CYANOETHYLCELLULOSE RESIN

Donald H. Hogle, Monroeville, Pa., assignor to Westinghouse Electric Corporation, East Pittsburgh, Pa., a corporation of Pennsylvania Filed Dec. 20, 1957, Ser. No. 704,154

3 Claims. (Cl. 260—232)

The present invention relates to the purification of dielectric materials and has particular reference to the purification of cyanoethylcellulose by means of ion exchange resins.

Solid plastic materials have been employed as insulation in electrical apparatus of various kinds. In general, however, such materials, in an unmodified form, have a relatively low dielectric constant. Conventional plastic materials may be modified by incorporating polar plasticizers therein whereby products having a relative high dielectric constant are produced. However, such products frequently are soft, rubbery, or tacky materials which have high dissipation factors. The use of such products in capacitors and like electrical apparatus, therefore, has not been completely satisfactory for both physical and electrical reasons.

Cyanoethylcellulose has been found to be free of many of the physical shortcomings of other solid plastic materials and to have an extremely high dielectric constant, viz. from about 12 to 16 at temperatures of from 25° C. to 100° C. at frequencies below 1 mc. However, at higher temperatures ordinary cyanoethylcellulose exhibits high electrical losses. These losses appear to be caused by the presence of ionic impurities that are impractical to remove by conventional reprecipitation methods.

The object of this invention is to provide a process for the purification of cyanoethylcellulose by ion exchange in which ionic impurities present in the cyanoethylcellulose are removed.

Another object of this invention is to provide purified cyanoethylcellulose having improved electrical characteristics at high temperatures.

Other objects of this invention will, in part, be obvious and will, in part, appear hereinafter.

Figure 1:
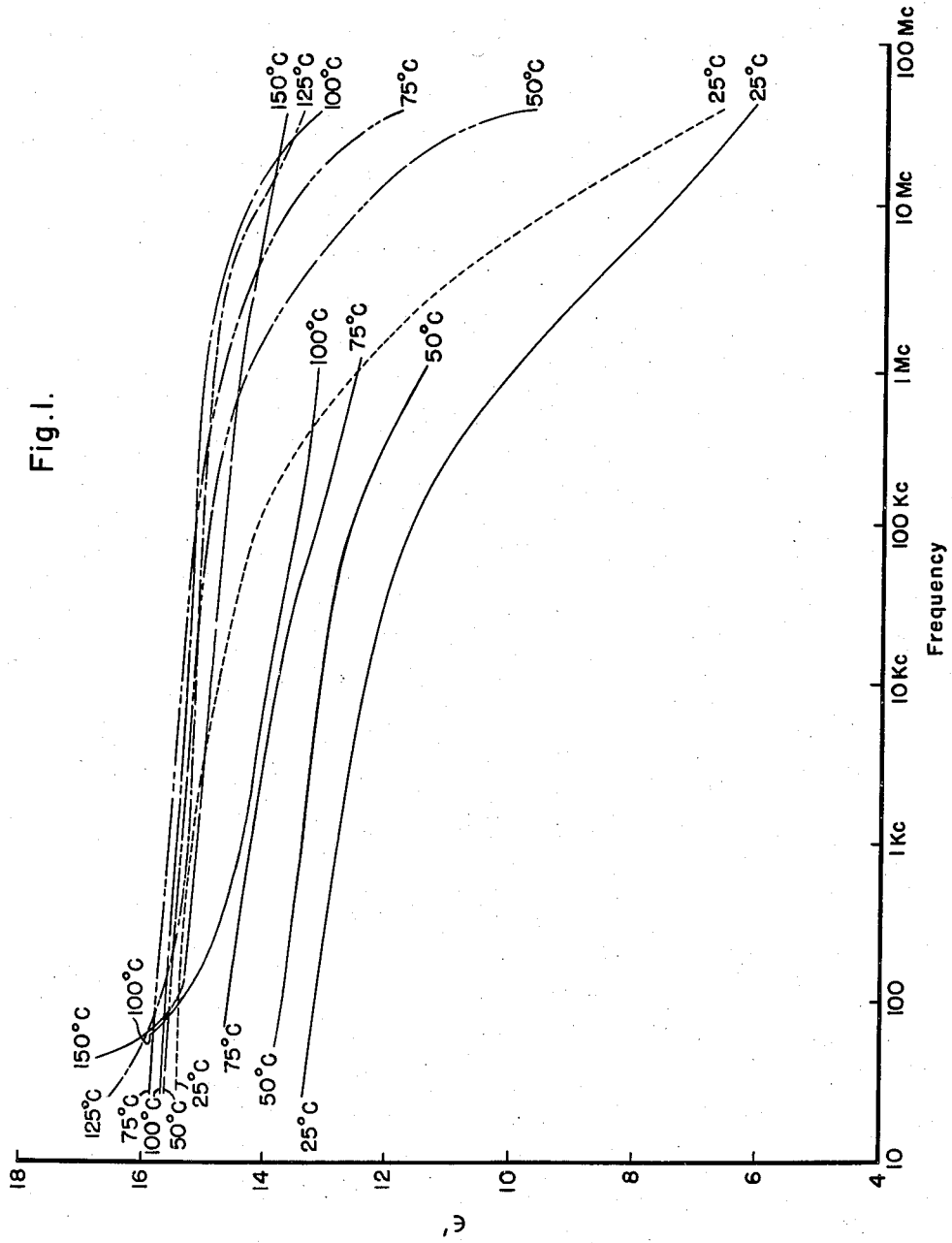

In order to describe the invention more fully reference is made to the following description taken in conjunction with the accompanying drawings, in which:

Figure 1 is a graph plotting the dielectric constant against frequency at four different temperatures of two samples of cyanoethylcellulose. The solid lines are plots of data derived from testing cyanoethylcellulose purified by washing with water and reprecipitation. The broken lines are plots of data derived from testing cyanoethylcellulose purified in accordance with this invention.

Figure 2:
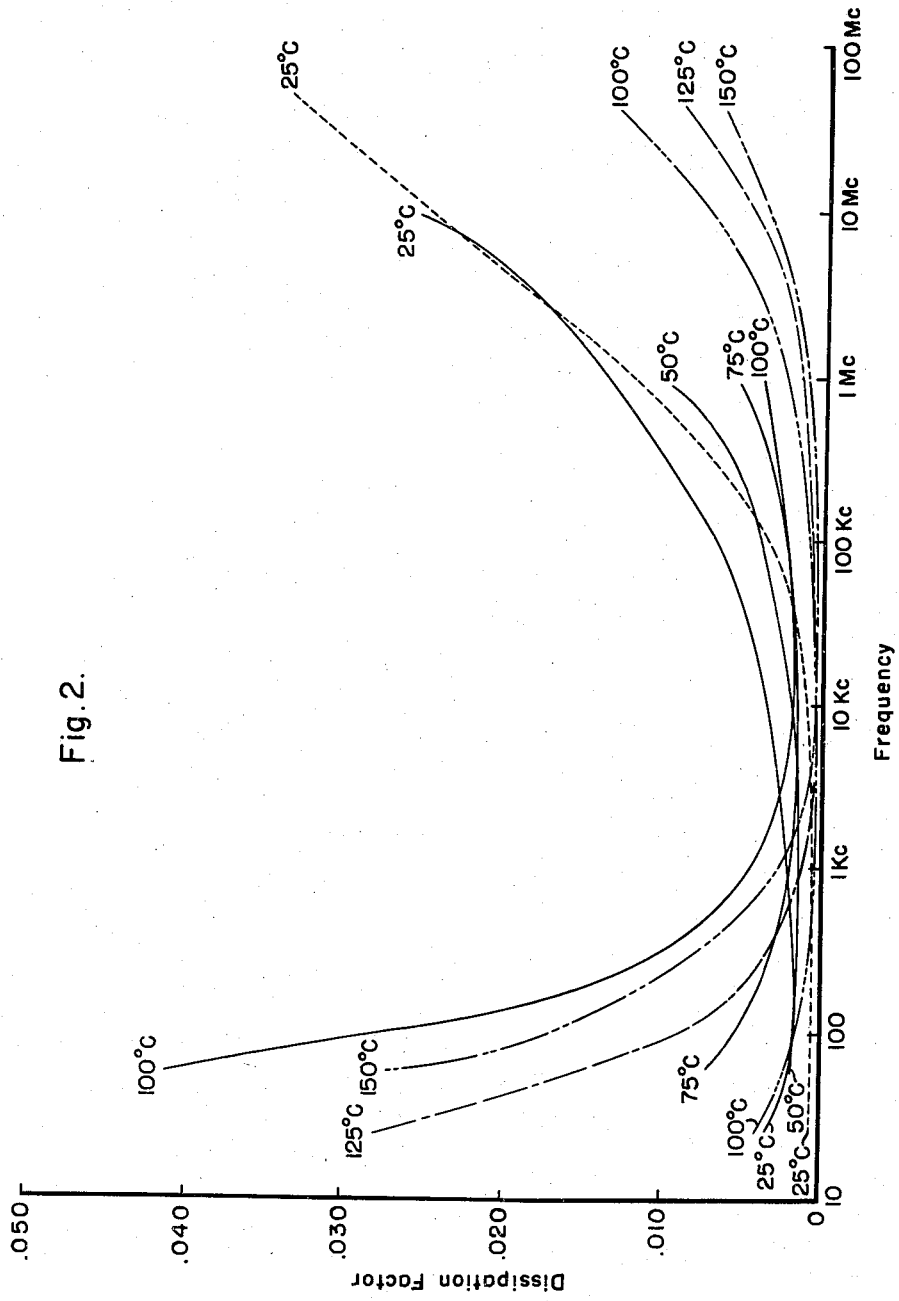

Figure 2 is a graph plotting the dissipation factor against frequency at four different temperatures of two samples of cyanoethylcellulose. The solid lines are plots of data derived from testing cyanoethylcellulose purified by washing with water and reprecipitating. The broken lines are plots of data derived from testing cyanoethylcellulose purified in accordance with this invention.

In accordance with the present invention and attainment of the foregoing objects broadly, there is provided a process for substantially complete removal of anionic and cationic impurities from cyanoethylcellulose whereby the electrical properties of said cyanoethylcellulose are improved. Briefly, the process comprises (1) contacting a solution of cyanoethylcellulose in a suitable solvent therefor, with an ion exchange material capable of removing both anionic and cationic components while maintaining the solution at a temperature sufficient to insure maximum contact between the cyanoethylcellulose and ion exchange resin, but not of such magnitude as to decompose said ion exchange resin, (2) separating said cyanoethylcellulose solution and said ion exchange material, and (3) removing substantially all water and solvent from said solution of cyanoethylcellulose, thereby producing a purified cyanoethylcellulose with greatly improved electrical properties.

More specifically, one method of preparing cyanoethylcellulose comprises reacting cellulose with a relatively large amount of acrylonitrile in the presence of a relatively small amount of water and an alkaline catalyst, for example, sodium hydroxide. After completion of the reaction the resultant product is washed with water and further purification is achieved by dissolving the product in acetone and precipitating it by adding a large excess of water. The resultant precipitate product is then redissolved and reprecipitated for further purification. Selection of the suitable solvent for the subsequent purification depends upon the form of cyanoethylcellulose involved, for example, for dicyanoethylcellulose a suitable solvent is pyridine and mixtures of pyridine and acetone, and for tricyanoethylcellulose nitromethane, pyridine, benzonitrile, acetonitrile, acetone and mixtures thereof, are suitable solvents.

The solution of cyanoethylcellulose in a solvent therefor is then contacted with a predetermined quantity of an ion exchange material. Satisfactory results have been achieved when the ion exchange resin and cyanoethylcellulose are reacted in a ratio of at least 2 parts to 1 part by weight. The ion exchange material must be capable of removing both anionic and cationic impurities. An example of a suitable ion exchange material which may be used is a mixture of a quaternary ammonium resin and sulfonated polystyrene sold commercially under the tradename Amberlite MB-1. Hereafter, Amberlite MB-1 will be referred to specifically. It must be understood, however, that equally satisfactory results can be achieved by using two separate ion exchange materials in separate containers one capable of removing anionic impurities and one capable of removing cationic impurities. The critical factor in selecting the ion exchange material or materials is that in removing the ionic impurities, which are believed to be sodium salts, for example sodium carbonate, the ion exchange material substitutes hydrogen for anions and hydroxyl for cations and does not substitute an equally deleterious material for the ion it removes. The above-mentioned Amberlite MB-1 substitutes hydrogen ions and hydroxyl ions which lead to the formation of water which is easily removable from the cyanoethylcellulose.

The Amberlite MB-1 material available commercially is saturated with water which would precipitate the cyanoethylcellulose from its solution in a solvent if not removed, therefore it has been found necessary to dry the ion exchange material before contacting the cyanoethylcellulose solution. Satisfactory results have been obtained by heating the Amberlite MB-1 to a temperature in the range of 65° C. to 70° C. for a period of 8 hours to 12 hours. Drying in a vacuum is also satisfactory—heating in this case is not necessary. Neither the temperature nor time is considered critical, care being taken that the temperature not be sufficient to decompose the ion exchange material.

The cyanoethylcellulose solution and a predetermined quantity of the Amberlite MB-1 are contacted in a vessel for a period of time sufficient for the ion exchange reaction to reach nearly equilibrium to remove the ionic impurities. During this period, the mixture is maintained at a temperature in the range of 40° C. to 80° C. and constantly agitated. As a result of the heating, the ion exchange material functions more rapidly. At a temperature below 40° C., the viscosity of the cyanoethylcellulose solution may be too high to insure adequate contact with the ion exchange resin, and above 80° C. the ion exchange material begins to decompose. Satisfactory results have been achieved using a temperature of approximately 50° C.

The chemical reaction between the cyanoethylcellulose and the Amberlite MB-1 is an equilibrium reaction. In practice, it has been found that at a temperature of 50° C., the equilibrium point is reached in about 1.5 hours. However, longer contact times are not detrimental. The cyanoethylcellulose and Amberlite MB-1 may be separated by filtration. The water reaction product and the solvent are removed from the cyanoethylcellulose by heating and distilling under vacuum. The recovered solid cyanoethylcellulose may be molded into a body such as a disc for testing its electrical properties. It has been found that the desired optimum electrical properties are achieved after three treatments of the cyanoethylcellulose with Amberlite MB-1, each treatment ranging in time from 1 hour to 1.5 hours. Filtration and distillation of volatile solvent are employed after each treatment.

The ion exchange material may be regenerated for reuse. If separate anionic and cationic ion exchange materials are employed, they are regenerated with an acid and an alkali such as sodium hydroxide, respectively.

The cyanoethylcellulose is freed from the solvent and water by heating to a temperature of about 120° C. to 130° C. in a vacuum of about 50 microns. Temperatures as low as 75° C. can be employed at lower absolute pressures of 1 micron or less.

The cyanoethylcellulose may also be contacted with the Amberlite MB-1 or other ion exchange material by successive passes through an ion exchange column filled with the material, said column being maintained at a temperature in the range of 40° C. to 80° C. Practice has taught that 3 to 5 passes are required through a tower 1.5 inches in diameter and 20 inches high. In general, however, better results have been obtained by utilizing the batch technique rather than the column technique. Probably better results occur because of the stirring obtained in batch treatment.

In order to test the electrical properties of the cyanoethylcellulose thus prepared, a portion of it is molded into discs 1 inch in diameter and 1/8 inch thick. The discs were molded at a temperature of 175° C. under a pressure of 8000 p.s.i. Lead foil electrodes are attached to the sides of the disc with silicone grease. Measurements of the dielectric constant and the dissipation factor of the cyanoethylcellulose discs at various frequencies and temperatures were made using a General Radio Schering bridge. At higher frequencies, a susceptance variation, resonant circuit was used. Tests were run on cyanoethylcellulose purified only by washing and reprecipitation as well as cyanoethylcellulose prepared in accordance with this invention. The results of these determinations, made at four different temperatures, are set forth in Figures 1 and 2 of the drawing. The cyanoethylcellulose purified only by washing and reprecipitation are represented by the solid lines, while test data from samples purified in accordance with the teaching of this invention are represented by the broken lines.

These test results demonstrate that cyanoethylcellulose, purified by ion exchange as disclosed herein, has an unexpectedly higher dielectric constant and also does not have as high dielectric losses as the other cyanoethylcellulose. These improved properties further are more pronounced at temperatures above 100° C.

Cyanoethylcellulose is suitable for use by the electrical industry in any of several different physical forms. It may be dissolved in a suitable solvent and cast in the form of films. If an acetone-cyanoethylcellulose solution is introduced into a large bath of water with rapid stirring or agitation, the cyanoethylcellulose will precipitate in the form of fibers which may be made into a paper in accordance with conventional paper making techniques. Such fibers also may be converted into the form of mats simply by subjecting a mass of such fibers to a relatively low temperature and pressure. A solution may also be impregnated into and coated on fibrous material for use in capacitors and other electrical apparatus. The high dielectric constant and lower dissipation factor cyanoethylcellulose of this invention is suitable for use in the manufacture of electroluminescent screens and in such other applications where storage of electrical energy is important.

The following example is illustrative of the practice of this invention.

*Example I*

Forty parts by weight of cellulose are soaked in 400 parts by weight of 2% sodium hydroxide for 1.5 hours. The liquid then is decanted, and the cellulose is pressed between sheets of blotting paper. The wet cellulose constituting about 100 parts by weight, then is transferred to a suitable reaction vessel equipped with a reflux condenser to which is added 680 parts by weight of acrylonitrile. The mixture is heated and stirred until refluxing commences. External heat is removed and the exothermic reaction is allowed to continue for about 80 minutes whereupon the cellulose is completely dissolved. Since the cellulose has been completely dissolved, its original fibrous structure has been destroyed. The resultant fluid is poured into a suitable vessel containing about 500 parts by weight of water and a few large pieces of Dry Ice. The Dry Ice is effective in agitating the liquid and neutralizing the alkali. After 5 minutes, the liquid is decanted, and fresh water and Dry Ice are added. The washing is continued until the washings are clear, colorless and neutral. During the washing, the cyanoethylcellulose product changes from a gummy mass to a collection of small hard non-fibrous yellow granules. Further purification may be achieved by dissolving the product in acetone and precipitating it from a large excess of water.

A 1% to 2% by weight of cyanoethylcellulose-pyridine solution is prepared. The cyanoethylcellulose-pyridine solution is contacted with an ion exchange material comprised of quaternary ammonium resin and a sulfonated polystyrene, which is sold under the tradename of Amberlite MB-1, in a ratio of 3 parts by weight ion exchange resin to 1 part by weight cyanoethylcellulose in a suitable vessel equipped with a stirrer and heating means. The mixture is agitated for 1.5 hours while being maintained at a temperature of 50° C. At the end of this time the cyanoethylcellulose-pyridine solution is separated from the ion exchange material by filtration. In practice, the cyanoethylcellulose is contacted three times with the ion exchange material for periods of about 1.5 hours to insure substantially total removal of ionic impurities. After the final contacting, the cyanoethylcellulose is precipitated from the cyanoethylcellulose solution and heated at about 125° C. in a vacuum of about 50 microns to remove the water reaction product and the pyridine.

The cyanoethylcellulose thus prepared is molded into discs 1 inch in diameter and 1/8 inch thick for testing. The discs were molded at a temperature of 175° C. under a pressure of 8000 pounds per square inch. Lead foil electrodes were attached to the sides of the disc with silicone grease. Measurements of the dielectric constant and the dissipation factor of the cyanoethylcellulose discs at various frequencies were made using a General Radio Schering bridge. At high frequencies, over 500 kilocycles, a susceptance variation, resonant circuit method was used.

Equally satisfactory results can be achieved by substituting a tower purification process in Example I for the batch process.

Since certain changes in carrying out the above process and in the product embodying the invention may be made without departing from its scope, it is intended that the accompanying description be interpreted as illustrative and not limiting.

I claim as my invention:

1. A process for removal of anionic and cationic impurities from cyanoethylcellulose whereby the electrical properties of said cyanoethylcellulose are improved which comprises contacting a solution of one part by weight of water-free cyanoethylcellulose in a solvent therefor selected from the group consisting of pyridine, acetone, nitromethane, and mixtures thereof with at least two parts by weight of a substantially water-free ion exchange material consisting of a mixture of quaternary ammonium resin and a sulfonated polystyrene which is in hydroxyl and hydrogen forms respectively which substitute hydrogen for anions and hydroxyl for cations, while maintaining the solution at a temperature in the range of 40° C. to 80° C., whereby hydrogen ions are substituted for anions and hydroxyl ions are substituted for cations during the contacting and water is formed, separating said cyanoethylcellulose solution and said ion exchange material, and removing substantially all water and solvent from said solution of cyanoethylcellulose, thereby producing a purified cyanoethylcellulose.

2. A process for removal of anionic and cationic impurities from cyanoethylcellulose whereby the electrical properties of said cyanoethylcellulose are improved which comprises contacting a solution of one part by weight of water-free cyanoethylcellulose in a solvent therefor selected from the group consisting of pyridine, acetone, nitromethane, and mixtures thereof, with at least two parts by weight of a substantially water-free ion exchange material consisting of a mixture of quaternary ammonium resin and a sulfonated polystyrene which is in hydroxyl and hydrogen forms respectively which substitute hydrogen for anions and hydroxyl for cations, while maintaining the solution at a temperature in the range of 40° C. to 80° C., whereby hydrogen ions are substituted for anions and hydroxyl ions are substituted for cations and water is formed, said contacting being repeated at least once, separating said cyanoethylcellulose solution from said ion exchange material, and removing substantially all water and solvent from said solution of cyanoethylcellulose to produce a purified cyanoethylcellulose.

3. A process for removal of anionic and cationic impurities from cyanoethylcellulose whereby the electrical properties of said cyanoethylcellulose are improved which comprises contacting a solution of water-free cyanoethylcellulose in a suitable solvent therefor selected from the group consisting of pyridine, acetone, nitromethane, and mixtures thereof, with a substantially water-free ion exchange material in a reaction tower, said ion exchange material consisting of a mixture of quaternary ammonium resin and sulfonated polystyrene which is in hydroxyl and hydrogen forms respectively which substitute hydrogen for anions and hydroxyl for cations, while maintaining the solution at a temperature in the range of 40° C. to 80° C. whereby hydrogen ions are substituted for anions and hydroxyl ions are substituted for cations and water is formed, separating said cyanoethylcellulose solution from said ion exchange material, and removing substantially all water and solvent from said solution of cyanoethylcellulose to produce a purified cyanoethylcellulose.

References Cited in the file of this patent

UNITED STATES PATENTS

| | | |
|---|---|---|
| 2,275,210 | Urbain et al. | Mar. 3, 1942 |
| 2,482,862 | Myers | Sept. 27, 1949 |
| 2,559,529 | Bauman | July 3, 1951 |
| 2,580,325 | Scott et al. | Dec. 25, 1951 |
| 2,617,800 | Bergman | Nov. 11, 1952 |
| 2,789,944 | Roth | Apr. 23, 1957 |